United States Patent
Morris et al.

(10) Patent No.: US 6,400,524 B1
(45) Date of Patent: Jun. 4, 2002

(54) ACOUSTIC ISOLATOR FOR A DISC DRIVE ASSEMBLY

(75) Inventors: Charles P. Morris, Norman; Kenneth L. Pottebaum, Yukon; John D. Stricklin, Oklahoma City, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/562,426

(22) Filed: May 1, 2000

Related U.S. Application Data (63) Continuation of application No. 09/255,217, filed on Feb. 22, 1999, now Pat. No. 6,081,406, which is a continuation of application No. 07/673,967, filed on Mar. 22, 1991, now Pat. No. 5,875,067.

(51) Int. Cl.[7] .............................................. G11B 17/00
(52) U.S. Cl. ................................................... 360/97.01
(58) Field of Search ......................... 360/97.01–97.04; 310/57; 369/263

(56) References Cited

U.S. PATENT DOCUMENTS

| | | | |
|---|---|---|---|
| 4,291,997 A | 9/1981 | Lasarkis | |
| 4,315,288 A | 2/1982 | Bernett et al. | |
| 4,346,416 A | 8/1982 | Riggle et al. | |
| 4,491,888 A | 1/1985 | Brown et al. | |
| 4,562,499 A | 12/1985 | Mizoshita | |
| 4,780,777 A | 10/1988 | Biermeir et al. | |
| 4,800,306 A | 1/1989 | Oberto | |
| 4,835,637 A | 5/1989 | Mach et al. | |
| 4,896,231 A | 1/1990 | Hoppe | |
| 4,899,237 A | 2/1990 | Tochiyama et al. | |
| 4,905,110 A | 2/1990 | Krum et al. | |
| 4,985,792 A | 1/1991 | Moir | |
| 4,988,903 A | 1/1991 | Koriyama | |
| 5,004,207 A | 4/1991 | Ishikawa et al. | |
| 5,021,095 A | 6/1991 | Sleger | |
| 5,025,336 A | 6/1991 | Morehouse et al. | |
| 5,060,103 A | 10/1991 | Ohtsuka | |
| 5,079,655 A | 1/1992 | Yagi | |
| 5,124,885 A | 6/1992 | Dew et al. | |
| 5,177,733 A | 1/1993 | Koike et al. | |
| 5,212,607 A | 5/1993 | Elsing et al. | |
| 5,214,549 A | 5/1993 | Baker et al. | |
| 5,295,027 A | 3/1994 | Elsing et al. | |
| 5,295,028 A | 3/1994 | Elsing | |
| 5,295,029 A | 3/1994 | Elsing et al. | |
| 5,305,164 A | 4/1994 | Elsing | |
| 5,349,486 A | * 9/1994 | Sugimoto et al. | 360/97.01 |
| 5,483,298 A | 1/1996 | Boutaghou | |
| 5,483,398 A | 1/1996 | Bataghou | |
| 5,666,239 A | 9/1997 | Pottebaum | |
| 5,675,456 A | 10/1997 | Myers | |
| 6,172,842 B1 | * 1/2001 | Satoh et al. | 360/97.01 |
| 6,177,173 B1 | * 1/2001 | Nelson | 360/97.01 |
| 6,229,668 B1 | * 5/2001 | Huynh et al. | 360/97.01 |
| 6,255,750 B1 | * 7/2001 | Mohajerani et al. | 360/97.01 |
| 6,256,165 B1 | * 7/2001 | Kim | 360/97.01 |

FOREIGN PATENT DOCUMENTS

| | | |
|---|---|---|
| JP | 62-137788 | 6/1987 |
| WO | WO 90/05982 | 5/1990 |

* cited by examiner

Primary Examiner—Allen Cao
(74) Attorney, Agent, or Firm—Crowe & Dunlevy (57) ABSTRACT

Method and apparatus for reducing acoustic noise emission in a disc drive assembly. A housing of the disc drive includes first and second plates and side walls which cooperate to form an enclosure for an excitation source disposed within the housing. At least a selected one of the plates has a contact point to which the excitation source is mechanically coupled, a first portion of the selected plate surrounding the contact point and a second portion thereof disposed between the first portion and an outer perimeter of the selected plate, with the second portion having an increased compliance with respect to the first portion. The increased compliance can be formed by reducing the thickness of the second portion. Damping material can be additionally supported by the second portion to provide further acoustic noise reduction.

9 Claims, 7 Drawing Sheets

ACOUSTIC ISOLATOR FOR A DISC DRIVE ASSEMBLY

RELATED APPLICATIONS

This application is a continuation of parent U.S. patent application Ser. No. 09/255,217 filed Feb. 22, 1999 (now U.S. Pat. No. 6,081,406), which in turn is a continuation of parent U.S. patent application Ser. No. 07/673,967 filed Mar. 22, 1991 (now U.S. Pat. No. 5,875,067).

BACKGROUND OF THE INVENTION

1. Field of the Invention

This invention relates generally to the field of disc drives and more particularly, but not by way of limitation, to an improved apparatus for reducing acoustic noise in disc drives.

2. Brief Description of the Prior Art

Disc drives of the type known as "Winchester" disc drives are well known in the industry. The archetype Winchester disc drives incorporated discs fourteen inches in diameter and were intended for use with large mainframe types of computers installed in specially constructed computer rooms in which such environmental elements as temperature and humidity were optimized for equipment operation. The users of such a system were typically located in locations far removed from the system itself and communicated with the system using keyboards and CRT displays called, appropriately enough, remote terminals. Since with such an arrangement only system maintenance and support personnel were commonly required to work directly within the computer room itself, little consideration was given to acoustic noise generated by such system elements as cooling fans and disc drive motors.

However, with the advent of personal computers, commonly located within office environments, acoustic noise generation has become a significant consideration in system design. Indeed, in some marketplaces, particularly Europe, the amount of allowable acoustic noise in the workplace is strictly controlled by regulatory agencies.

With such restrictions being placed on systems manufacturers, it has become common practice for manufacturers who expect to sell their products multinationally to analyze their intended market and specify their systems to meet the strictest requirements demanded in all target marketplaces.

Since most computer system manufacturers do not internally produce their own disc drives, but depend on specialized disc drive manufacturers, these system manufacturers have begun to strictly specify the amount of acoustic noise that the disc drive itself can contribute to the overall system.

In disc drives of the current technology, the major source of acoustic noise is sympathetic vibration of the disc drive housing caused by the spindle motor used to spin the discs or by the actuator used to move the read/write heads across the discs for data accesses. These disc drives are often in the form of a rectangular housing with a spindle motor and actuator motor mounted to the internal surface. Recent market demands for increased capacity, with accompanying increases in precision, have caused disc drive manufacturers to attach the shaft of the spindle motor and the pivot shaft of the rotary actuator motor to both the bottom and top plates of the disc drive housing. This has frequently resulted in housing surfaces vibrating at resonant frequencies that increase the total amount of acoustic noise.

Several approaches to acoustic noise reduction have been taken by disc drive manufacturers. Most of these involve the addition of compliant isolation devices between the noise source (the motors) and the external housing. However, such devices add expense to the design and require that space be set aside for them within the housing. With market trends toward increased capacity and smaller physical drive sizes, manufacturers have been understandably reluctant to allow room for these types of noise isolation devices in their designs.

Clearly, a need has arisen for an apparatus for reducing acoustic noise that does not add to manufacturing costs and also does not require additional space within a disc drive assembly.

SUMMARY OF THE INVENTION

The present invention provides an improved acoustic isolation apparatus comprising an acoustic compliance area integrally formed as a portion of a support member, such as the housing assembly of a disc drive assembly, for the purpose of reducing resonant vibration from an excitation source, such as a motor component in the housing assembly. The acoustic compliance area provides an increase in compliance to the support member along a selected axis while maintaining required rigidity of the support member. A damping pad,may be provided, supported on the acoustic compliance area, for damping acoustic coupling in cooperation with that achieved by the acoustic compliance area.

When integrally formed as a portion of the structure member, the acoustic isolator is formed by selectively reducing the thickness of the structure member, such as the wall of a housing assembly, to provide a determined increase in compliance in the selected axis.

It is an object of the present invention to provide an improved acoustic isolation apparatus to reduce acoustic resonant vibration in a disc drive assembly and the like.

Another object of the present invention is to provide an improved acoustic isolation apparatus that achieves the above stated object and which does not require space within the disc drive assembly.

Yet another object of the present invention is to provide an improved acoustic isolation apparatus that achieves the above stated objects while permitting simple selection of frequencies to be isolated.

One other object of the present invention is to provide an improved acoustic isolation apparatus that achieves the above stated objects while being inexpensive to manufacture.

Other objects, features and advantages of the present invention will be apparent from the following detailed description when read in conjunction with the drawings and appended claims.

BRIEF DESCRIPTION OF THE DRAWINGS

FIG. 8 is a bar graph showing the reduction in overall noise derived from testing various configurations of the present invention.

DETAILED DESCRIPTION OF THE INVENTION

Figure 1:
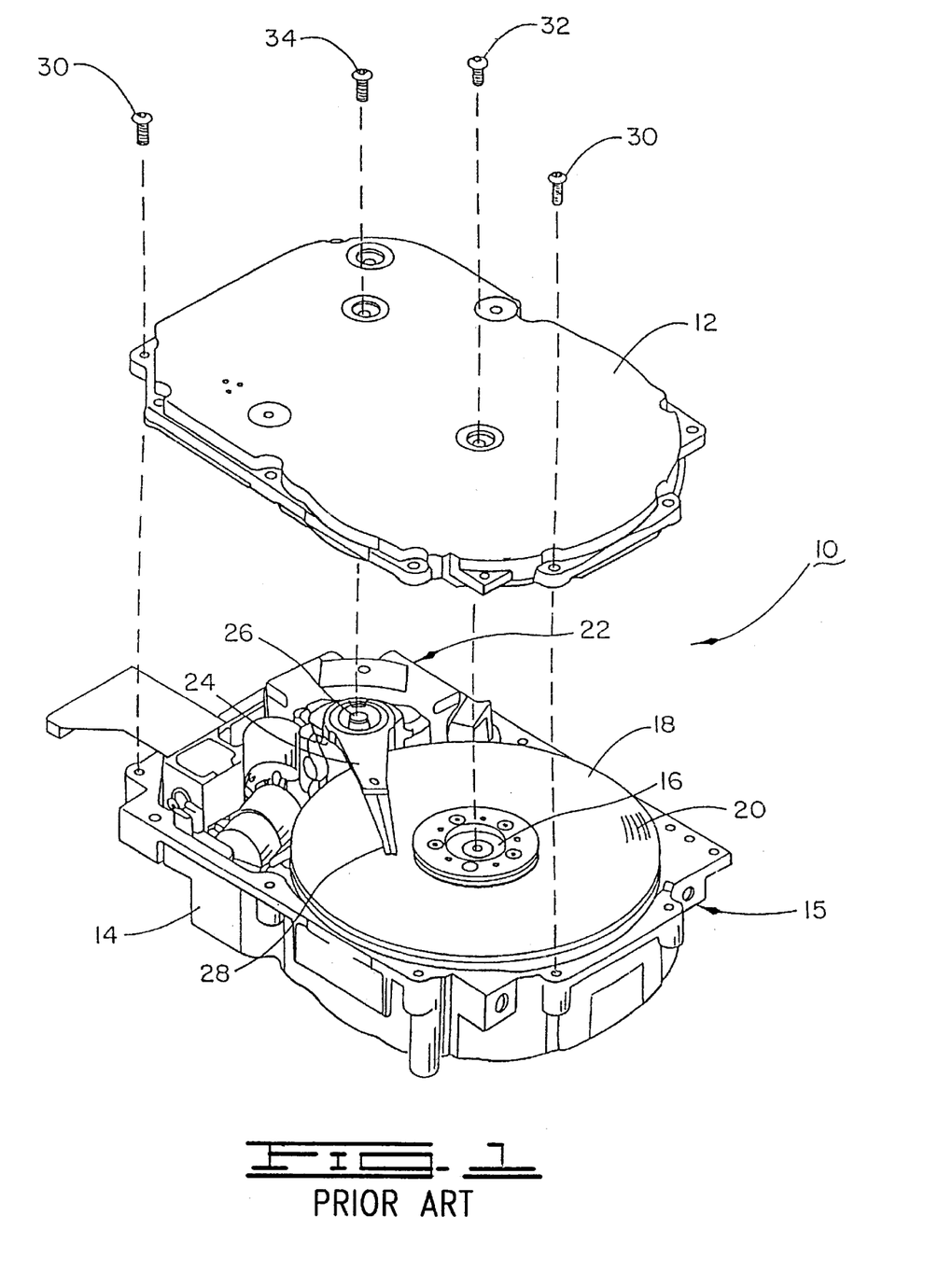
FIG. 1 is a perspective view of a prior art disc drive assembly with the top cover removed, showing the relationship between the major mechanical components therein.

Referring to FIG. 1, shown is a perspective view of a typical disc drive assembly 10 with its top cover 12 removed to show the relationship between the major internal mechanical components. A base casting 14 is provided, which together with the cover 12 forms a disc housing 15, and a spindle motor 16 is attached to the base casting 14 within the disc housing is. Mounted on the spindle motor 16 are a number of circular discs 18 coated with a magnetic recording medium. Digital information is recorded on the discs 18 in a large number of circular, concentric data tracks 20 (a few of which are depicted). When power is applied to the disc drive assembly 10 the spindle motor 16 begins to rotate the discs 18 at a constant high speed. In the example shown, the discs 18 would rotate in the counter-clockwise direction.

An actuator motor, shown generally at 22, is also mounted to the base casting 14 and operates under the control of electronic circuitry (not shown) to selectively rotate an actuator body 24 about a pivot shaft 26. Attached to this actuator body 24 is a plurality of read/write head assemblies 28 (one shown) which are used to record data on and retrieve data from the data tracks 20.

Disc drives typically pack the data tracks 20 on the discs 18 at a density greater than 1000 tracks per inch measured radially on the disc surface. The actuator motor 22 used to move the read/write heads 28 can typically seek to any desired data track 20 in less than about 20 milliseconds on the average. This makes the precision and stability of the geometric relationship between the discs 18 and heads 28 of critical importance.

In order to increase the precision and stability of the relationship between the discs 18 and heads 28, both the bottom and top of the shaft of the spindle motor 16 and the bottom and top of the pivot shaft 26, about which the actuator body 24 pivots, are secured respectively to the base casting 14 and cover 12.

In FIG. 1, a plurality of machine screws 30 (some of which are shown) are used to fasten the top cover 12 to the base casting 14 by appropriately disposed and mating apertures (in the top cover 12) and threaded bores (in the base casting 14). One particular screw 32 extends through an aperture in the top cover 12 and into a threaded bore in one end of the shaft of the spindle motor 16, while a second screw 34 extends through an aperture in the top cover 12 and fastens the top of the pivot shaft 26 of the actuator body 24 in a similar manner. With this type of arrangement, when the disc drive 10 is completely assembled, tilt between the actuator body 24 and the spindle motor 16 is minimized.

Figure 2:
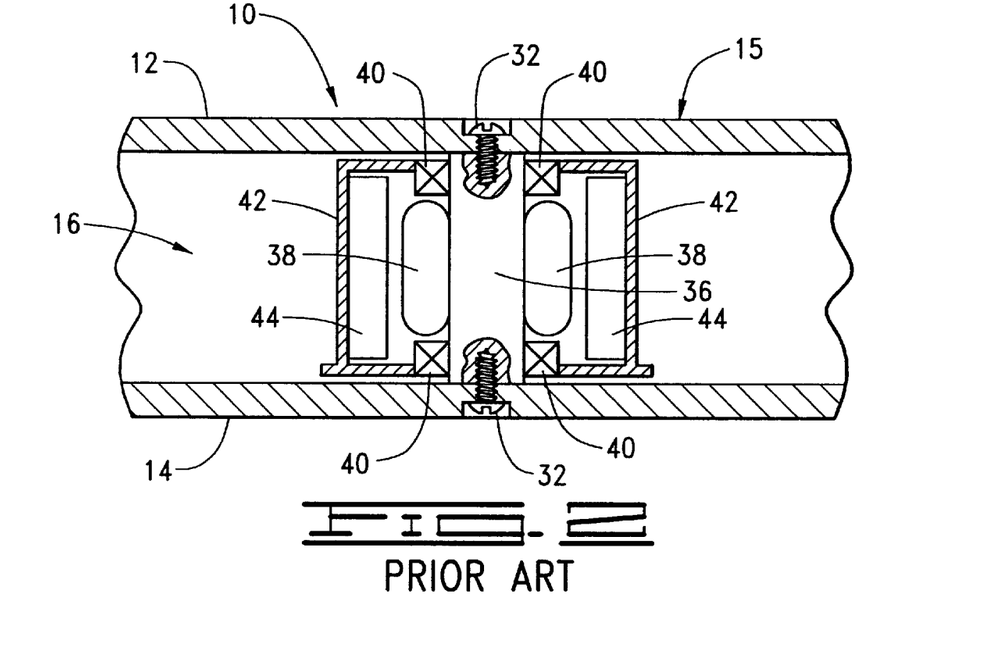
FIG. 2 is a partially detailed cutaway view of a portion of the prior art disc drive assembly of FIG. 1 showing the spindle motor thereof.

FIG. 2 is a simplified sectional view of a disc drive assembly, such as the disc drive assembly 10 of FIG. 1, and which incorporates the spindle motor 16 attached to the drive housing 15 at both its top and bottom. A like configuration exists for the support of the pivot shaft 26 of the actuator body 24. That is, the pivot shaft 26 is attached to the disc housing 15 by similar screws so as to be secured at both its top and bottom. The motors 16, 22 serve as sources of vibration; therefore, the discussion hereinbelow of the spindle motor 16 is equally applicable to the actuator motor 22.

In FIG. 2, the base casting 14, the top cover 12 and the spindle motor 16 are shown in a partially detailed sectional view. The spindle motor 16 incorporates a stationary shaft 36 which is fastened to the top cover 12 and base casting 14 by screws 32 which extend through axially aligned apertures in the top cover 12 and base casting 14 to threadingly engage tapped bores in the ends of the shaft 36. A number of drive coils 38 are fixedly mounted to and about the shaft 36, as is an arrangement of ball bearings 40 (depicted schematically in FIG. 2). A rotor hub 42 is mounted on the outer surface of the ball bearings 40 and supports a plurality of permanent magnets 44. The number of coils 38 and the number of polarity reversals in the magnets 44 is a matter of design choice. When current is commutatively applied to the coils 38, the rotor hub 42 rotates about the shaft 36. The rotor hub 42 is used to support the discs (not shown) in a manner well known in the industry. Clearly, this type of motor mounting provides for minimum "wobble" of the spindle motor 16, and serves to preserve the intended geometric relationship between the heads and the discs (not shown).

This configuration does, however, present another problem. Since the two motors (the spindle motor 16 and the actuator motor 22) are rigidly attached to both the top and bottom of the disc housing 15, any vibration in the motors 16, 22 will be transmitted to the disc housing 15. This can cause the top and bottom surfaces of the housing to vibrate in sympathy with the motors, particularly if the natural frequency of either of the surfaces of the top cover 12 or base casting 14 is a harmonic of the motor vibration. Such vibration can easily cause amplification of the vibrations into acoustic noise at these resonant frequencies.

It would be extremely desirable, therefore, to isolate the vibration of these motors 16, 22 from the surfaces of the base casting 14 and top cover 12 without sacrificing the rigidity offered by the configuration shown in FIG. 2. This is achieved by the present invention.

Figure 3:
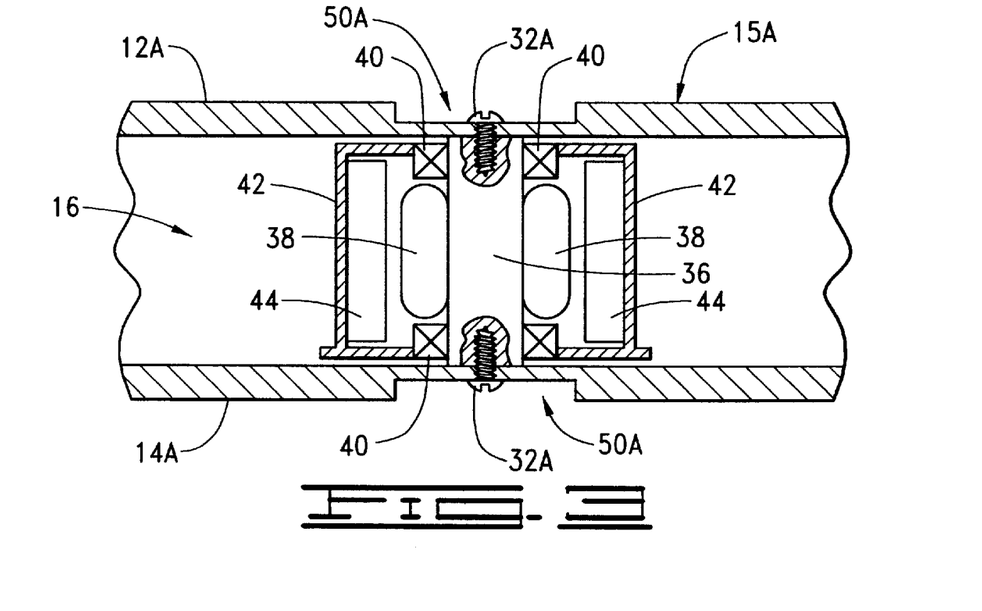
FIG. 3 is a partially detailed cutaway view similar to FIG. 2 but showing a portion of a disc drive assembly incorporating the present invention.

Shown in FIG. 3 is a disc drive housing 15A which has been constructed in accordance with the present invention. The spindle motor 16 is shown mounted in the disc housing 15A, in a manner similar to that shown in FIG. 2, via screws 32A. Immediately above and below the stationary shaft 36 of the spindle motor 16, a portion of the housing wall about the screws 32A has been thinned on each of the top cover 12A and base casting 14A, thus forming an acoustic compliance area 50 described more fully hereinbelow. That is, the purpose of this reduction of wall thickness will be described with reference to the schematical representations depicted in FIGS. 4A and 4B.

Figure 4A:
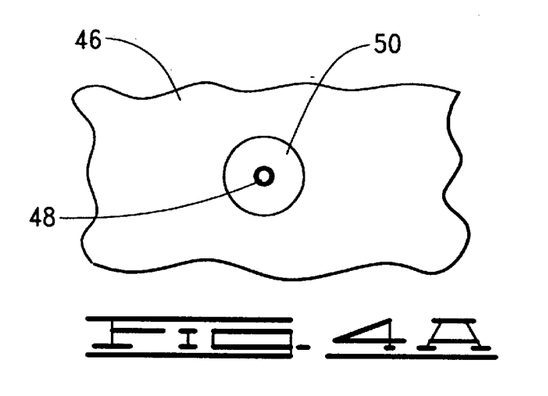
FIGS. 4A and 4B are simplified plan and sectional views, respectively, of a portion of a plate member, incorporating one embodiment of the invention.
Figure 4B:
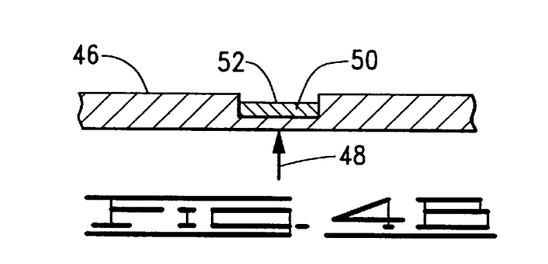

Depicted in FIGS. 4A and 4B are plan and cross-sectional views, respectively, of a portion of a plate or support member 46 subject to an excitation source 48 at a contact point represented by a bold arrow. That is, the motors 16, 22, being attached to the disc drive housing 15A, are excitation sources which impart vibration energy to the supporting structure. FIGS. 4A and 4B depict the fundamental relationship between a motor and disc drive housing arrangement, incorporating the present invention, as described above and illustrated in FIG. 3.

In FIGS. 4A and 4B the acoustic compliance area 50 is a thinned area of generally circular profile which surrounds and extends radially from the excitation source 48; that is, the acoustic compliance area 50 has a reduced wall thickness with respect to the rest of the surrounding plate 46. This acoustic compliance area 50 forms an area of increased compliance in a single direction, that is, in a vertical direction (that is, in an axis coextensive with the longitudinal axis of the stationary shaft 36). The forces exerted by the excitation source 48 will thus result in increased vertical deformation in this high compliance area 50 with the forces being effectively isolated from the remainder of the plate 46, thus impeding coupling of the vibrations from the excitation source 48 and the support member 46.

The acoustic compliance area 50A shown in FIG. 3, the reduced thickness areas above and below the shaft 36, demonstrates the incorporation of high compliance areas in a vertical axis to reduce the acoustic noise produced by the spindle motor 16 in the disc drive housing 15A.

It will be recognized that the term "vertical" is used herein as one of convenience to designate the orientation of the axes of increased compliance achieved by the acoustic compliance areas 50, 50A, and is not intended to be limiting. Clearly, if the disc drive housing 15A is caused to be disposed in a different orientation such that the shaft 36 extends other than vertically, the axis of increased compliance will remain parallel to the axis of the shaft 36. Further, as used herein, the term "compliance" refers to the ability of a material to deform within its elastic limits to flex, or bend, in response to vibratory excitation.

As shown most clearly in the cross-sectional view of FIG. 4B, an optional damping material or damping pad 52 is supported on the acoustic compliance area 50. This can be any of several commercially available damping materials, such as that available under the trademark, scotchdamp, a product of 3M Company. Support of this damping pad 52 on the acoustic compliance area 50 (or on the acoustic compliance areas 50A in FIG. 3) results in even higher damping of vibration without violating the dimensional extremes permitted of the plate 46 in its support of the excitation source.

When comparing the vibration isolation of the present invention to typical prior art isolation devices such as shock mounts, rubber grommets, etc., certain advantages of the present invention become evident.

1. The acoustic noise reduction achieved by the present invention is attained by an integral part of the supporting structure. This minimizes part count for a disc drive assembly.
2. Further, because the present invention achieves acoustic noise reduction with an integral part of the supporting structure, no space is taken up within the housing assembly where space is at a premium due to the compact design of most disc drive assemblies.
3. The acoustic noise reduction achieved by the present invention is due to selectively determined localized compliance along one axis, while at the same time, the rigidity of the remainder of the structure is maintained in other axes as necessary to prevent cylinder tilt of the discs 18.
4. As an integral part of the support structure, the acoustic isolation apparatus of the present invention is an ideal location for the inclusion of damping material, an option which increases damping of the excitation source.

The frequency range between which the present invention provides acoustic isolation is determined by the stiffness of the area of reduced thickness, which in turn is controlled by the size and thickness of this area of reduced thickness. Thus, designs utilizing this invention can readily be optimized to provide acoustic isolation for any desired frequency range. Careful selection of the location, size and shape of these areas of reduced thickness allows the designer to control which frequencies are to be isolated.

In FIGS. 4A and 4B, the acoustic compliance area 50 surrounds the excitation source 48 and provides the contact point for this source. In practice, a modification of this embodiment may be chosen for reasons of strength of attachment. Such a configuration is shown in FIGS. 5A and 5B.

Figure 5A:
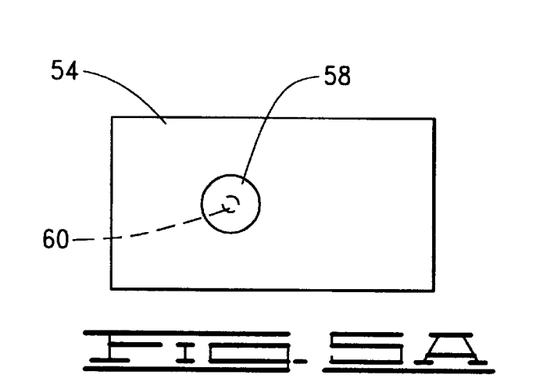
FIGS. 5A and 5B are simplified plan and sectional views of a portion of a plate member, incorporating another embodiment of the invention.
Figure 5B:
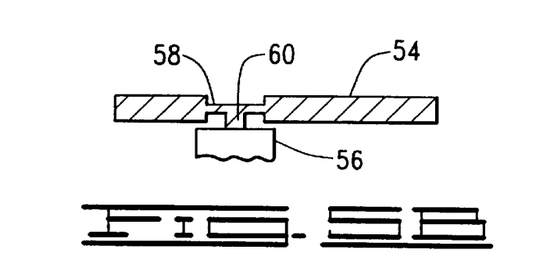
Figure 5C:
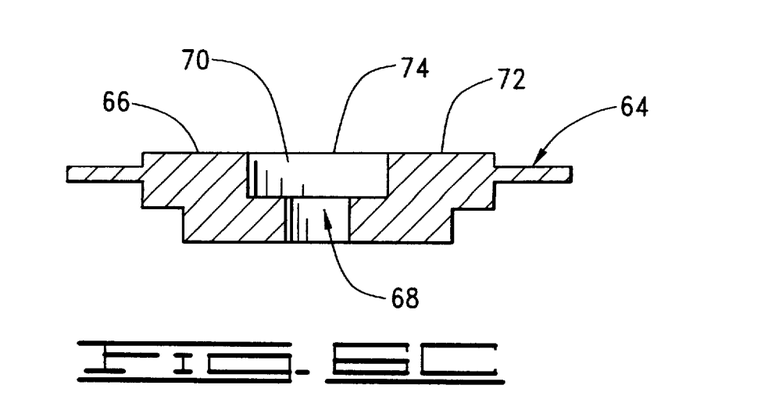

FIGS. 5A and 5B are plan and sectional views of a portion of a top cover 54 with a spindle motor 56 mounted as an excitation source similar to the arrangement of FIGS. 4A and 4B. The primary difference between FIGS. 5A, 5B and FIGS. 4A, 4B is that a small area in the middle of an acoustic compliance area 58 has been left thicker to provide a mounting point 60 for the spindle motor 56. Because this mounting point 60 is small in relation to the size of the acoustic compliance area 58, this arrangement provides all the features and advantages of the previous example, with the additional advantage that a strong mounting location has been provided for the spindle motor 56. Again, damping materials can be located on the acoustic compliance area 58 without exceeding the dimensional limits of the components.

Figure 6:
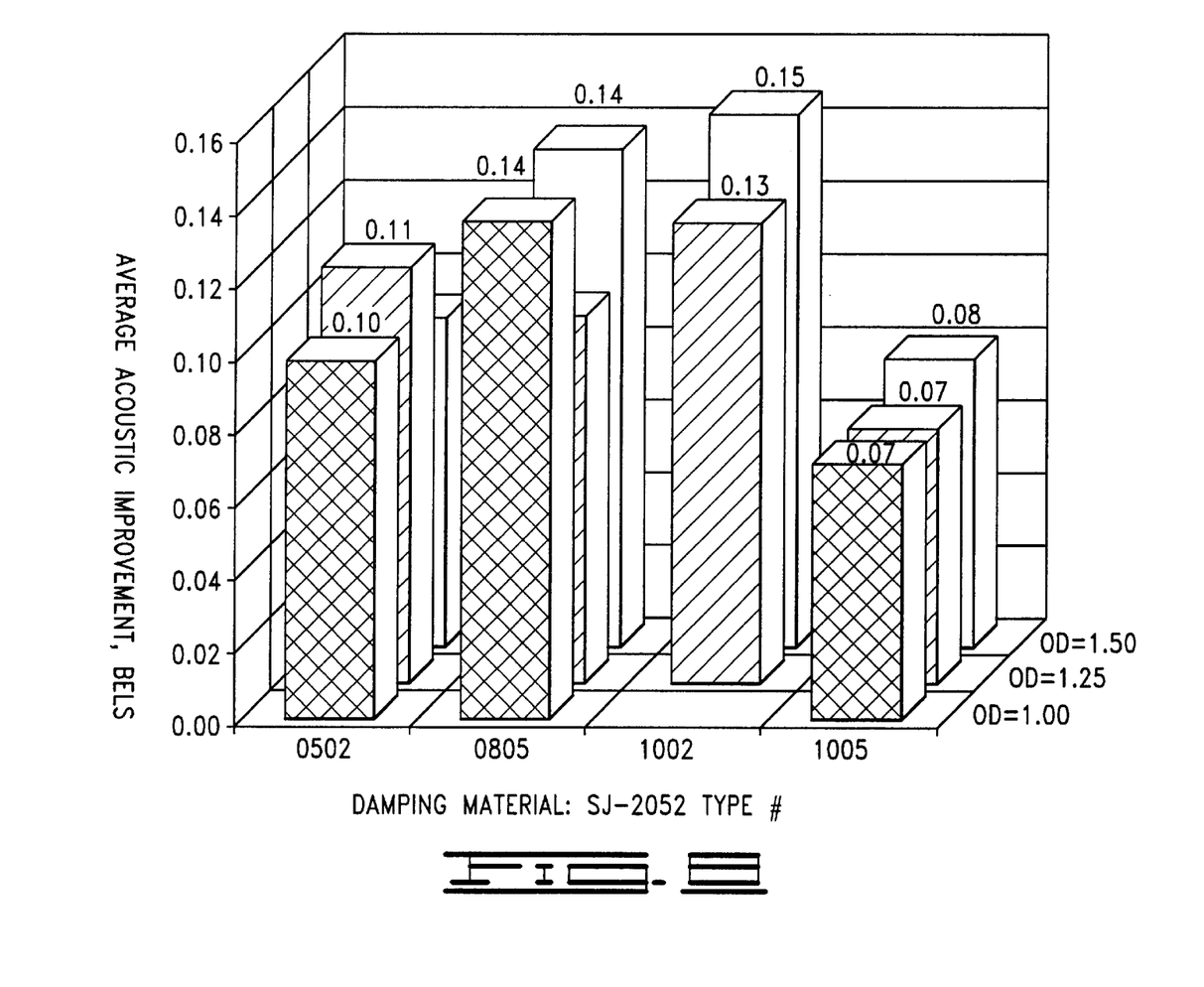
FIGS. 6A, 6B and 6C are plan, sectional and detail views of a disc drive top cover incorporating the present invention.

FIGS. 6A, 6B and 6C are top plan, sectional and detail views, respectively, of a portion of another top cover 62 incorporating the present invention. As shown, this configuration is similar to that of FIGS. 5A and 5B. The majority of the top cover 62 is a relatively thick plate which provides necessary stiffness to the overall housing structure. An area of reduced thickness or an acoustic compliance area 64 is generally of circular profile and centered about a mounting boss 66 for attachment to the top of a spindle motor shaft or other excitation source (not shown). The acoustic compliance area 64 is formed by reducing the thickness of the top cover 62 from both above and below the mounting boss 66. That is, as shown in FIG. 6B, the acoustic compliance area 64 comprises a top thinned area 64A and a lower thinned area 64B, the lower thinned area 64B having the deepest surface recession, an arbitrary design selection.

As most clearly shown in FIG. 6C, the mounting boss 66 incorporates several features. The mounting boss 66 includes a hole 68 for the passage of a spindle attachment screw (not shown), and has a top surface recess 70 which allows the head of a spindle attachment screw (not shown) to lie within the dimensional limits of the top cover 62. Surrounding this recess 70 is a second shallow recess 72 adapted to receive a sealing label 74 (shown in FIG. 6C only) adhesively applied thereto which serves to prevent the entrance of contaminants into the sealed disc environment. This sealing label 74 preferably will carry a notice that the warranty is voided if removed in order to discourage access to the inner components except by authorized service personnel.

The sectional view of FIG. 6B illustrates the thickness of the acoustic compliance area 64 relative to the remainder of the top cover 62. In practice, a top cover thickness of about 0.100 inch and a reduced thickness around the mounting boss of 0.020 inch have been used for aluminum housings. These measurements, however, are intended only to serve as a general reference to relative thickness, and would vary depending upon material selection and other design specifics.

The top thinned area 64A of the acoustic compliance area 64 is recessed below the top surface of the remainder of the top cover 62 to provide a location for the installation of optional damping material of the type previously noted, should such be desirable. Proper selection of the size and thickness of the acoustic compliance area 64, and the incorporation of the concepts to be discussed below, can obviously be expected to result in reduction in both peak values for amplitude at particular frequencies and in overall energy.

The acoustic noise encountered in disc drive technology ranges in frequency up to about 10 Khz. Depending upon the specific geometry and other design factors for any particular disc drive, certain frequencies will be more prominent and will receive the focus of attention for noise reduction by the application of the present invention. That is, the problem of noise reduction addressed by the designer varies from one model to another. The present invention provides the designer with a tool for tuning or attenuating certain frequencies, or ranges of frequencies, as necessary to prevent undesirable coupling of vibrations from an excitation source (usually a spindle motor or an actuator) to the housing. Use of the present invention by the designer results in the production of disc drives having acceptable acoustic noise emission. Especially is this important for the control of audible acoustic noise within acceptable limits. That is, the production of quieter disc drives can be assured.

For reducing acoustic noise in the critical frequencies, the effectiveness of the present invention is demonstrated by the test results shown in Table 1 which lists the overall acoustic noise levels of three different disc drives, both with and without the use of the present invention, and the reduction in noise that the incorporation of the present invention brought about. The disc drives generally conformed to the description provided hereinabove for the disc drive assembly 10. For these tests, discs housing having an compliance area with an inner diameter of 0.55 inch and an outer diameter of 1.50 inches were used. Also, damping material, Scotchdamp SJ-2052, Type 1002, was included.

Figure 7:
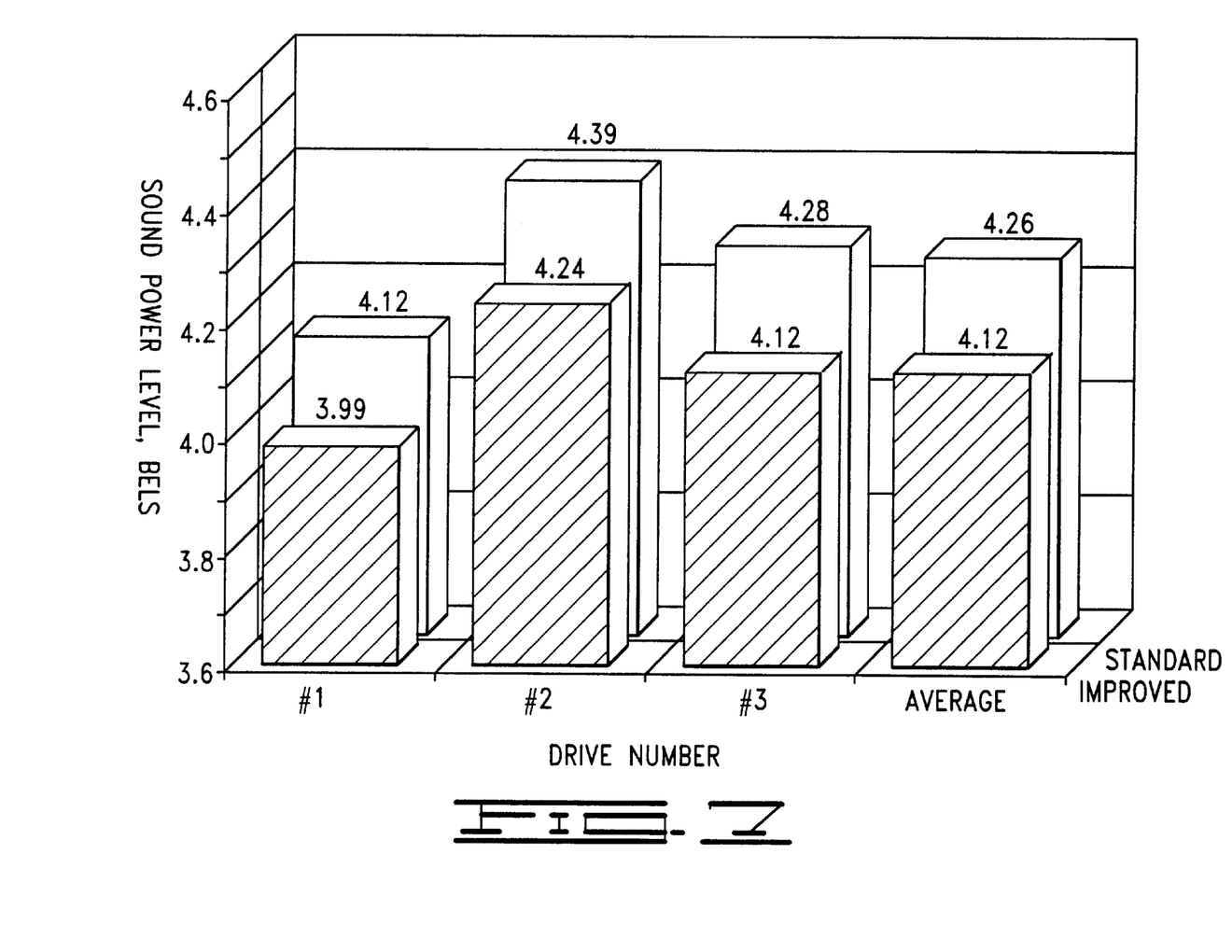
FIG. 7 is a bar graph comparing the overall sound levels on tested disc drive assemblies incorporating the present invention and showing the improvement in noise level.

It should be noted that in Table 1 and in FIGS. 7 and 8, sound levels are measurements of sound power/A weighted (Lwa) and are given in units of Bels (one Bel equals ten decibels). "A weighted" means that the frequency sensitivity of the human ear has been considered and applied to the measurements of pure sound to make the measurements more meaningful in terms of human sensation. Furthermore, it should be noted that a reduction or increase of 0.3 Bels Lwa represents a halving or doubling of the sound power level, respectively.

TABLE 1

|  | Lwa with standard top cover | Lwa with thin section isolator | Reduction (Bels) |
|---|---|---|---|
| Drive #1 | 4.12 | 3.99 | .13 |
| Drive #2 | 4.39 | 4.24 | .15 |
| Drive #3 | 4.28 | 4.12 | .16 |
| Average | 4.26 | 4.12 | .15 |

This same information is also reflected in graphic form in FIG. 7. As shown by Table 1 and FIG. 7, a significant reduction in total acoustic noise was achieved by the acoustic isolation apparatus of the present invention.

Testing was also conducted to determine the type of damping material that results in the greatest reduction in acoustic noise. FIG. 8 is a bar graph, illustrating the results of this testing. Four types of damping material, designated as Types 0502, 0805, 1002 and 1005 of scotchdamp SJ-2052 damping material, available from the 3M Company, are represented in the graph. All tests utilized with an inner diameter of 0.55 inch, and outer diameters, of, 1.00 inch, 1.25 inches and 1.50 inches, to find an optimum combination. The results of this testing varied greatly. As shown, the combination of Type 1002 damping material with an acoustic compliance area having a 1.50 inch outer diameter brought about an improvement of 0.15 Bels. The combination of type 0805 damping material and outer diameters of 1.00 inch and 1.5 inches reduced acoustic levels by 0.14 Bels.

While these tests utilized specific damping materials, significant reductions in acoustic noise level are to be expected utilizing other types of damping materials produced by other manufacturers.

All discussions and examples cited thus far deal with the use of a single acoustic compliance area in a plate and a single excitation source. Obviously, in an actual disc drive, more than one point of the housing must be considered and multiple sources of excitation, along with multiple paths for transmission of vibration, have to enter into the analysis. For instance, as discussed above, the actuator motor is also a potential source of undesirable noise. Similarly, since the spindle motor and actuator motor are now frequently attached to both the top and bottom of the drive housing, isolating only the top of the motors will not result in optimum noise reduction.

Most disc drive housings have sides small enough, and therefore stiff enough, to have natural frequencies outside the range of frequencies of concern. However, further isolation of the top and bottom plates of the housing from these sides, and therefore from each other, is desirable.

Figure 9A:
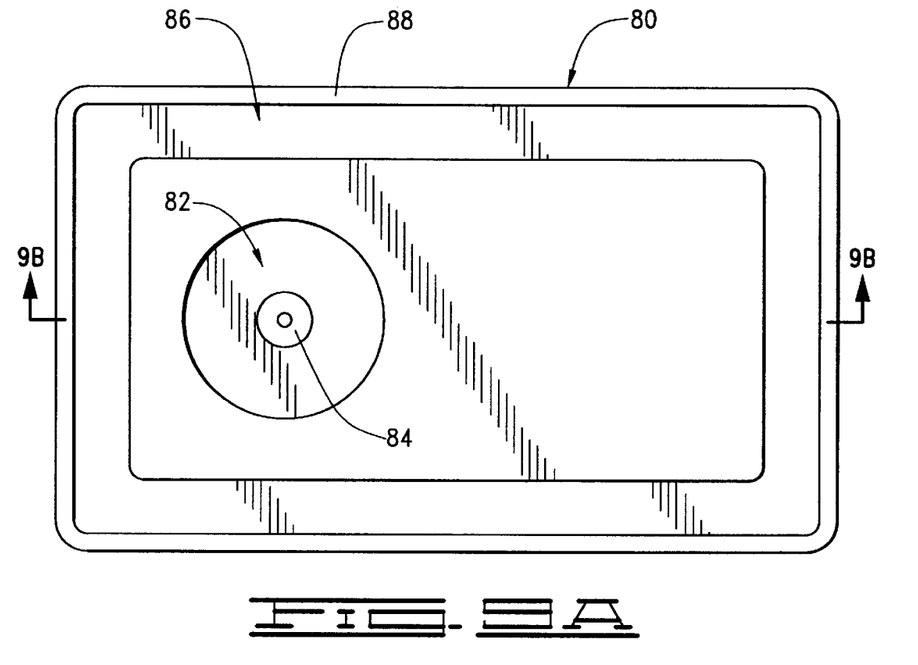
FIGS. 9A and 9B are plan and sectional views of a disc drive top cover showing yet another embodiment of the present invention.
Figure 9B:
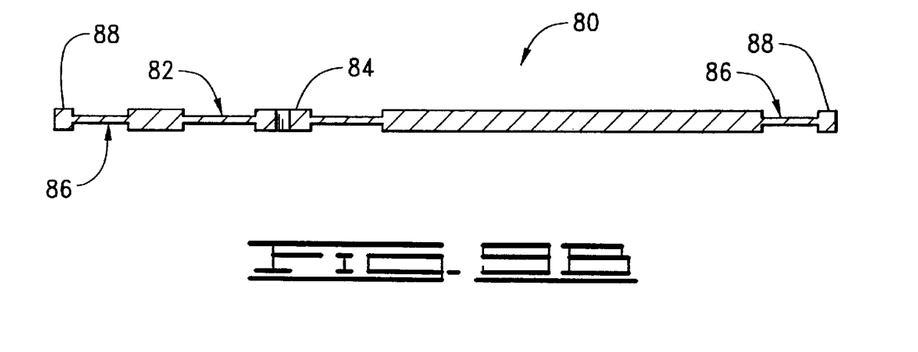

FIGS. 9A and 9B illustrate a plate 80 representative of a top or bottom plate of a disc drive housing. FIG. 9A is a plan view of the plate 80 and FIG. 9B is a sectional view of the plate 80, taken along line 9B—9B of FIG. 9A. Shown incorporated into the plate 80 is a first acoustic compliance area 82 of the type discussed above including an attachment boss 84 for the attachment of a spindle motor (not shown). A second acoustic compliance area 86 is shown closely adjacent the perimeter 88 of the plate 80. This second acoustic compliance area 86 serves to isolate the center of the plate 80 from any vibration which might be coupled to the plate at its perimeter 88. In a disc drive, if the plate 80 were the top cover of the housing assembly, any vibration in the lower plate (caused by, for instance, the opposite end of the spindle motor), could be passed from the lower plate of the housing through the sidewalls of the housing to the outer perimeter 88 of the plate 80. The second acoustic compliance area 86, being an area of reduced thickness and thereby increased compliance, would effectively isolate the plate 80 from these vibrations. The dimensions of the second acoustic compliance area 86 (the width and thickness) would determine the specific performance of the isolator, and the second acoustic compliance area 86 could be expected to significantly lower the natural frequency of the entire plate 80.

The inventive concept of selectively isolating vibration sources from plates by providing areas of reduced thickness in a housing to reduce overall acoustic noise is not limited by the size, shape, number or location of these areas of reduced thickness. That is, applications involving different excitation frequencies, differing numbers of excitation sources and diverse response parameters can be envisioned.

It will be clear that the present invention is well adapted to carry out the objects and attain the advantages mentioned as well as those inherent therein. While presently preferred embodiments of the invention have been described for the purposes of this disclosure, numerous changes can be made which will readily suggest themselves to those skilled in the art and which are encompassed within the spirit of the invention disclosed and as defined in the appended claims.

What is claimed is:

1. A disc drive, comprising:
   an excitation source which rotates about an excitation axis; and
   a housing which supports the excitation source, comprising:
   a top cover;
   a bottom cover which cooperates with the top cover to form an enclosure in which the excitation source is disposed, wherein at least a selected one of the top and bottom covers comprises a plate which extends substantially normal to the excitation axis, the plate having an outermost perimeter, a contact point to which the excitation source is mounted, a first portion which extends at least 180 degrees about the contact point and which has a first thickness as measured in a direction parallel to the excitation axis, and a second portion disposed between the first portion and the outermost perimeter which extends at least 180 degrees about the contact point and which has a second thickness as measured in a direction parallel to the excitation axis, wherein the first thickness is greater than the second thickness; and
   a damping material affixed to the second portion of the plate, wherein the damping material has a damping material thickness as measured in a direction parallel to the excitation axis, and wherein the first thickness is nominally equal to the second thickness in combination with the damping material thickness.

2. The disc drive of claim 1, wherein the excitation source comprises a spindle motor which rotates a recording disc.

3. The disc drive of claim 1, wherein the excitation source comprises an actuator assembly which supports a head adjacent a rotatable recording disc.

4. The disc drive of claim 1, wherein the at least a selected one of the top and bottom covers comprises the top cover, and wherein the top cover further comprises side walls which depend from the outermost perimeter and matingly engage the bottom cover.

5. The disc drive of claim 1, wherein the first portion extends 360 degrees about the contact point.

6. A method for assembling a disc drive assembly, comprising steps of:
   (a) providing an excitation source;
   (b) providing a plate configured to support the excitation source at a contact point so that the excitation source rotates about an excitation axis substantially normal to the plate, the plate comprising an outermost perimeter, a first portion which extends at least 180 degrees about the contact point and which has a first thickness as measured in a direction parallel to the excitation axis, and a second portion disposed between the first portion and the outermost perimeter which extends at least 180 degrees about the contact point and which has a second thickness as measured in a direction parallel to the excitation axis, wherein the first thickness is greater than the second thickness;
   (c) attaching the excitation source to the plate; and
   (d) placing a damping material on the second portion of the plate, wherein the thickness of the first portion is substantially equal to a combined thickness of the second portion of the plate and the damping material.

7. The method of claim 6, wherein the plate of step (b) further comprises a third portion between the first portion and the second portion, the third portion extending at least 180 degrees about the contact point and having a third thickness as measured in a direction parallel to the excitation axis, wherein the third thickness is less than the first thickness.

8. The method of claim 6, wherein the excitation source of providing step (b) comprises a spindle motor which rotates a recording disc.

9. The method of claim 6, wherein the excitation source of providing step (b) comprises a spindle motor which rotates a recording disc.

* * * * *